May 28, 1940.                G. D. OWEN                2,202,228
                             TRANSPLANTER
                        Filed Feb. 21, 1939           2 Sheets-Sheet 1

Inventor
G. D. Owen
By Watson E. Coleman
Attorney

May 28, 1940. G. D. OWEN 2,202,228
TRANSPLANTER
Filed Feb. 21, 1939 2 Sheets-Sheet 2
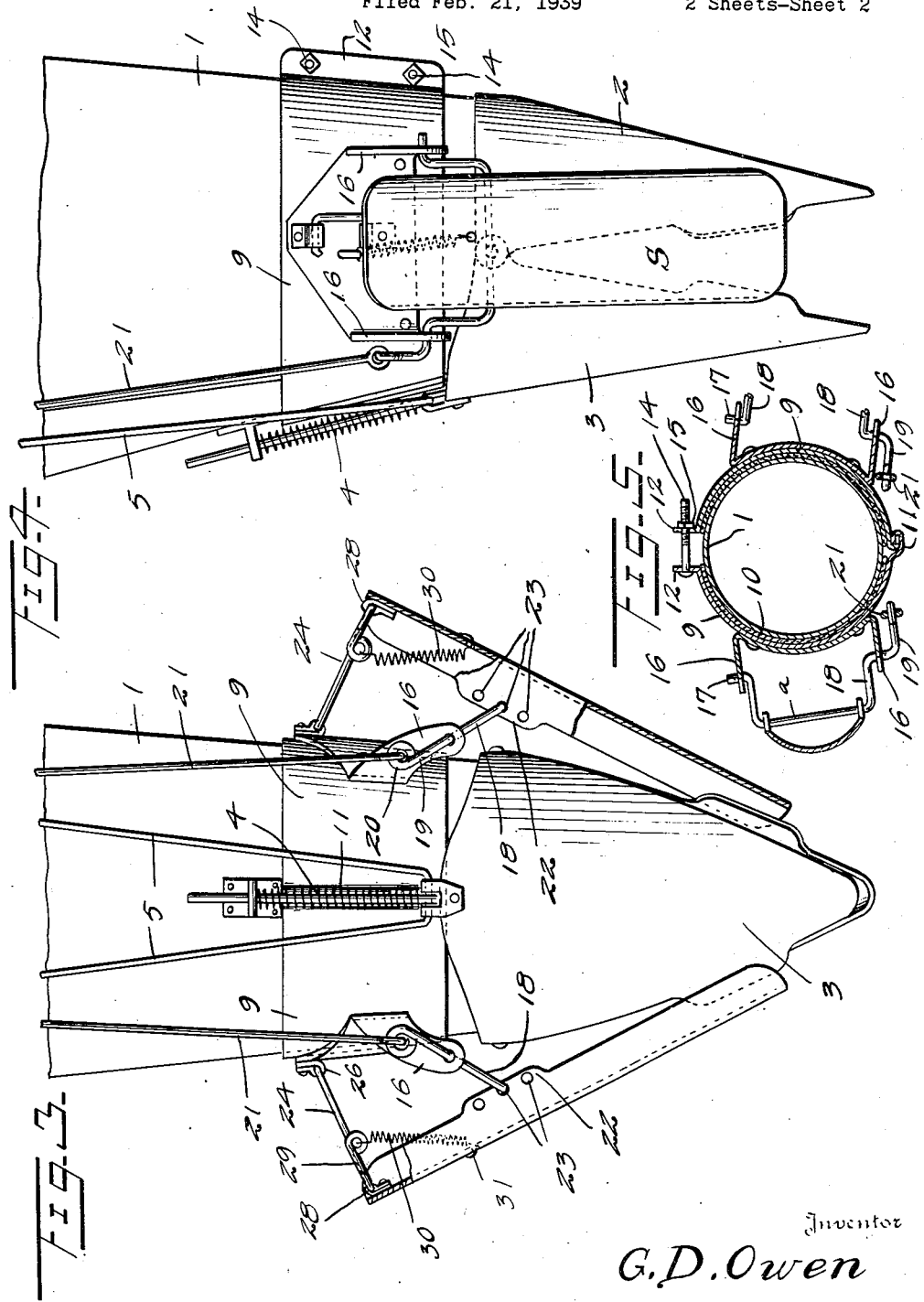
Inventor
G. D. Owen
By Watson E. Coleman
Attorney Patented May 28, 1940

2,202,228

UNITED STATES PATENT OFFICE 2,202,228

TRANSPLANTER

George D. Owen, Brookneal, Va.

Application February 21, 1939, Serial No. 257,723

4 Claims. (Cl. 111—4)

This invention relates to transplanters, and it is an object of the invention to provide means for packing soil around the roots of a plant at the time of transplanting whereby the plant will be properly supported by the soil.

It is also an object of the invention to provide a soil packing attachment which can be readily applied to the general type of transplanters now in use and wherein said attachment is operatively connected with the operating lever for the transplanter proper.

An additional object of the invention is to provide a soil packing means for a transplanter comprising two relatively movable shovels with means for normally maintaining said shovels in a position whereby said shovels offer no hindrance or obstruction to the operation of the transplanter proper.

The invention consists in the details of construction and in the combination and arrangement of the several parts of my improved transplanter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in rear elevation of a transplanter having applied thereto an attachment constructed in accordance with an embodiment of my invention;

Figure 2 is a view in side elevation of the assembly as illustrated in Figure 1;

Figure 3 is an enlarged rear elevational view of the lower portion of the transplanter with the applied attachment partly in section and with the packing shovels in their lowered position;

Figure 4 is a fragmentary view in side elevation of the structure illustrated in Figure 3;

Figure 5 is a sectional view taken substantially on the line 5—5 of Figure 1;

Figure 6 is a fragmentary view partly in top plan and partly in section illustrating one of the connecting links for the upper portion of a packing shovel.

As disclosed in the accompanying drawings, 1 denotes a body member or reservoir of desired dimensions and which has secured to its lower portion a stationary shovel 2 with which coacts a swinging shovel 3. The shovel 3 is constantly urged toward the shovel 2 by the expansible member 4. The shovel 3 has operatively engaged with the upper portion thereof the rods 5 which are in turn operatively engaged with the side arms 6 of the operating lever L for the transplanter.

This lever L, as herein disclosed, is pivotally held, as at 7, to the upper portion of a plant chute 8 and extends inwardly of the member or reservoir 1.

The various parts hereinbefore referred to in themselves form no part of the present invention as they are comprised in a transplanter of the type particularly described and illustrated in Patent #2,034,530 which issued March 17, 1936, to Ward B. Owen. It is, therefore, believed that a further detailed description in connection with the transplanter proper is unnecessary other than to state that the opening movement of the shovel 3 together with the discharge of water from within the member or reservoir 1 is under control of the lever L.

In transplanting tobacco plants and the like, it is often found necessary to pack soil around the plant or more particularly the roots thereof to leave the plant in an erect position and properly supported. To effect this packing of the soil I provide my improved attachment. This attachment as comprised in the embodiment of the invention shown in the accompanying drawings, includes two plates 9 of desired dimensions and which are adapted to snugly engage around the lower portion of the body member or reservoir 1 at a point closely adjacent to the shovels 2 and 3. These plates 9 have adhesively or otherwise secured to the inner faces thereof a fabric lining 10 to assure an effective mounting of the plates 9 upon the body member or reservoir 1 and without injury thereto.

End portions of these plates 9 are provided with reverted flanges 11 which are adapted to be interlocked after the plates 9 have been applied around the member or reservoir 1 and the opposite end portions of the plates 9 are provided with the outstanding flanges 12 through which are directed the bolts 14. Associated with the bolts 14 are the nuts 15 whereby the plates 9 may be effectively clamped in applied or working position. Each of the plates 9 at substantially its transverse center is provided with a pair of outwardly disposed and transversely spaced ears 16 herein disclosed as extending downwardly on a predetermined curvature. Rotatably supported by the ears 16 is a shaft 17 and the portion of the shaft 17 between the ears 16 is formed to provide a crank 18 of desired throw. The shaft 17 outwardly of one of the ears 16 carries a rock arm 19 coplanar with the crank 18 and extending in a direction away from the crank 18. The outer or free end portion of this arm 19 is operatively connected, as at 20, to the lower end portion of a rod 21 which is also operatively engaged to a side member 6 of the lever L and at a point preferably inwardly of the connection of the adjacent rod 5 with said member 6.

Freely mounted upon the cross member $a$ of the crank 18 is a packing shovel S. As herein disclosed the shovel S is of a length substantially equal to the length of a shovel 2 or 3 and is arcuate in cross section. The longitudinal marginal portions of the shovel S intermediate the ends thereof are formed to provide the outstanding flanges 22. These flanges 22 are provided with the openings 23 spaced apart lengthwise of the flanges and through which the cross member *a* of the crank 18 is selectively disposed in accordance with the desired adjustment of the shovel S.

Interposed between the upper portion of the shovel S and the associated plate 9 is a rigid link 24 of desired length and which, as herein disclosed, is provided at one end with a lateral extension 25 which is freely directed through a sleeve 26 carried by the upper end portion of the shovel S. The opposite end portion of the link 24 is also provided with a lateral extension 27 which is freely disposed through the sleeve 28 suitably fixed to the adjacent plate 9. This extension 27 carries an arm 29 extending inwardly of the link 24 and substantially in parallelism therewith. The outer end portion of this arm 29 has secured thereto a retractile spring 30 which in turn is operatively connected, as at 31, to the shovel S at a desired distance below the upper end thereof. The link 24 is of such length to assure desired inward and downward movement of the lower end portion of the shovel S when the crank 18 is caused to swing downwardly. Furthermore, this link 24 assures the shovel S being maintained in proper position when the shovels 2 and 3 are closed so that said shovel S will offer no hindrance or obstruction to the insertion of the closed shovels 2 and 3 into the soil when transplanting.

After the shovels 2 and 3 have been forced into the soil, pull is imposed upon the lever L to separate said shovels 2 and 3 to permit the plant to drop. During the period the shovel 3 swings outward, the shovels S will be caused to swing downwardly and inwardly and thereby closely pack soil around the plant and more particularly the roots thereof to assure the deposited plant being maintained erect and effectively set.

As the shovel 3 is returned to closed position with respect to the shovel 2 the shovels S will be returned to their normal raised position and as the cranks 18 pass the horizontal center the springs 30 will facilitate this return of the shovels S.

It is to be stated that the path of travel of the lower end of each of the shovels S is determined by the length of its associated link 24.

As particularly illustrated in the accompanying drawings, it is to be noted that when my improved attachment is applied the shovels S are in a position to have movement in a path of travel substantially at right angles to the path of travel of the shovel 3.

From the foregoing description it is thought to be obvious that a transplanter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A soil packing attachment for a transplanter including relatively movable shovels and an operating lever therefor, said attachment comprising a pair of shafts having cranks which can be swung downwardly, means for mounting said shafts upon the transplanter adjacent to the shovels, means for operatively connecting the shafts with the operating lever of the transplanter for rocking the shafts for swinging the cranks downwardly when the shovels of the transplanter have relative outward movement, packing shovels freely mounted upon the cranks for movement therewith, links operatively engaged with the packing shovels, and means for operatively securing said links to the transplanter, said links providing means for regulating the downward movement of the packing shovels with the cranks.

2. A soil packing attachment for a transplanter having relatively movable shovels and an operating lever for the shovels, said attachment comprising plates, means for clamping the plates to the transplanter adjacent to the shovels, shafts having cranks which can be swung downwardly carried by the plates, means for connecting the shafts to the lever of the transplanter for swinging the cranks downwardly when the lever is operated to separate the shovels of the transplanter, packing shovels freely mounted upon the cranks for movement therewith, said packing shovels extending above and below the shafts, and links interposed between the plates and the upper portions of the packing shovels for regulating the downward swinging movement of the packing shovels.

3. A soil packing attachment for a transplanter having relatively movable shovels and an operating lever for the shovels, said attachment comprising plates, means for clamping the plates to the transplanter adjacent to the shovels, shafts having cranks which can be swung downwardly carried by the plates, means for connecting the shafts to the lever of the transplanter for swinging the cranks downwardly when the lever is operated to separate the shovels of the transplanter, packing shovels freely mounted upon the cranks for movement therewith, said packing shovels extending above and below the shafts, links pivotally connected with the plates and the upper end portions of the packing shovels to regulate the downward swinging movement of the packing shovels, end portions of the links engaged with the packing shovels being continued by inwardly directed rock arms, and retractile members connected to the rock arms and to the packing shovels.

4. A soil packing attachment for a transplanter including relatively movable shovels and an operating lever to effect such relative movement of the shovels, said attachment comprising plates, means to clamp said plates to the transplanter adjacent to the shovels, a shaft carried by each of the plates and having a crank which can be swung downwardly, said shaft having a rock arm, means for operatively connecting the rock arm to the lever of the transplanter for swinging the crank downwardly when the lever is operated to open the shovels, packing shovels pivotally connected to the cranks for movement therewith, and links pivotally connected to the plates and to the packing shovels to regulate the downward swinging movement of the packing shovels with the cranks.

GEORGE D. OWEN.